W. L. WOODS.

BILL-FILES.

No. 7,840. Reissued Aug. 7, 1877.

WITNESSES:

Franck L. Dunaud

M. Gardner

INVENTOR:

William L. Woods.

by L. Deane,

ATTORNEY.

N. PETERS, PHOTO-LITHOGRAPHER, WASHINGTON, D. C.

UNITED STATES PATENT OFFICE.

WILLIAM L. WOODS, OF WASHINGTON, DISTRICT OF COLUMBIA.

IMPROVEMENT IN BILL-FILES.

Specification forming part of Letters Patent No. 46,415, dated February 14, 1865; Reissue No. 7,840, dated August 7, 1877; application filed July 18, 1877.

*To all whom it may concern:*

Be it known that I, WILLIAM L. WOODS, of Washington, in the District of Columbia, have invented certain new and useful Improvements in Bill-Files; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 3:
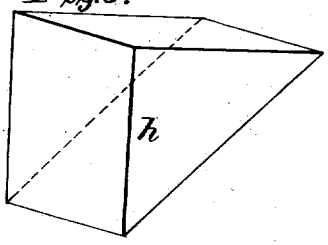
Figure 1:
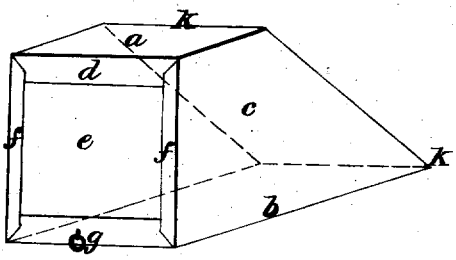
Figure 2:
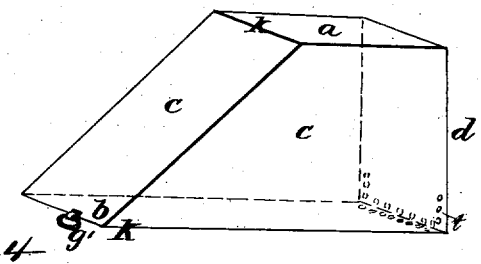
Figure 4:
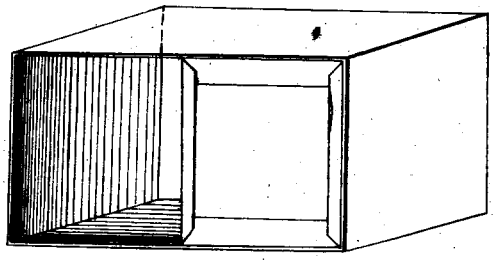
Figure 5:
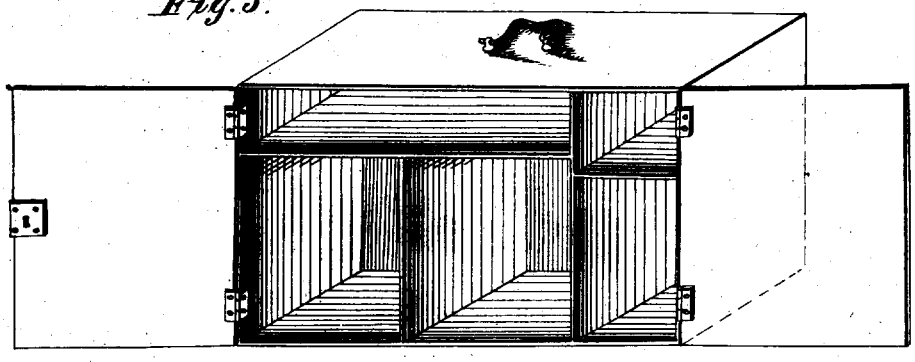

Figure 1 is a perspective view from the outer or front end of the file or paper holder, showing it removed from its case, envelope, or receptacle. Fig. 2 is a perspective of the same taken from the opposite end. Fig. 3 is a perspective view of the supplemental cap. Fig. 4 is a section of ordinary pigeon-holes, in which is placed one of the files or paper holders. Fig. 5 is a perspective view of a safe, desk, portable case, or device of like kind, having different-sized pigeon-holes.

The design of the present invention is to produce a file or paper holder, adapted to be contained in any convenient receptacle; and it consists more particularly in so constructing said file or paper holder that it will be suited to allow readily the deposit or placing of the papers therein, and afford ready means for access to them, and in so combining said file or paper holder with a containing case, pocket, envelope, or receptacle that it may be easily placed in the same and held therein, or removed therefrom when occasion renders desirable, all as will now be more in detail set out and explained.

In the accompanying drawings, A denotes a file or paper holder of any convenient size, and made of any suitable material or combination of different material. It is closed at one end and open at the other. The sides *c c* of the file or paper holder are chamfered or beveled from the upper to the lower edge, and thus the top of the file or paper holder, as at *a*, will be somewhat shorter than the base *b*. This form of construction gives the file or paper holder a sort of wedge-like shape or configuration, and is adapted chiefly that the base *b* may afford a support or back for the papers filed, while in front opportunity will be given to examine easily the endorsements on the papers, or to file papers or to remove them. The two sides *c c* are made of like shape and size.

The end *d* is of any suitable construction to insure permanence of shape to the file or paper holder. On its outer edges may be formed, attached, or placed cleats or guides *f f* to hold a tablet or label, *e*, on which any memorandum or index may be made.

In adapting the file or paper holder to its pocket, case, envelope, or receptacle it will, of course, be understood that the chamfered or open end is put in first, then the closed end will, when the file or paper holder is pushed wholly in, close the pocket, case, envelope, or receptable.

By means of rings *g*, attached to the outer or front end *d*, the file or paper holder can be readily withdrawn from its envelope, case, pigeon-hole, or receptacle, and by the ring *g'* attached to the opposite end the file or paper holder, when out or detached, may be conveniently hung up. By means of the perforation *t* in the front or outer end *d* or bottom, which may be as few or many as desired, provision is made for ventilating the file or paper holder, and the papers in it, every time it is withdrawn from or thrust into its pigeon-hole, envelope, case, or receptacle.

In some instances it may be of advantage to secure to the file or paper holder the cap *h*, which is intended to be in shape and size the complement of the same.

In this shape it can be used generally, as before described, since said cap can be easily turned back when necessary, and otherwise the file or paper holder can be as readily deposited in its case, envelope, pigeon-hole, or receptacle as before when said cap was not attached.

My file or paper holder may be used in any suitable case, pocket, envelope, pigeon-hole, or receptacle; and these may be made in groups, as now shown in the drawings, or may be single. They may be fixed and permanent, as in desks, shelves, vaults, safes, and the like, or portable, and adapted for personal use, or upon tables or desks. The range in the mere form and detail of construction, material of which made, size, and shape will, of course, be very considerable, as well as the method of adapting to use; and I do not therefore limit my said invention to the exact particulars in these respects, which I have above set out in order to illustrate and explain the nature and scope of my said invention.

Having thus described my invention, what I consider new, and desire to secure by Letters Patent, is—

1. The file or paper holder herein described, having its inner end open and its sides chamfered or beveled, in combination with its case, substantially as and for the purposes set forth.

2. The combination of a file or paper holder having an open inner end and beveled sides, giving it a general wedge shape, and its outer end made of metal, as described, with a case wholly enveloping it, excepting at the outer end, substantially as set forth.

In testimony that I do claim the foregoing I have hereunto set my hand this 14th day of July, 1877.

W. L. WOODS.

Witnesses:
L. DEANE,
T. C. CONNOLLY.